United States Patent
Zeljkovic et al.

(10) Patent No.: US 9,858,345 B2
(45) Date of Patent: *Jan. 2, 2018

(54) METHOD AND APPARATUS FOR USING A DISCRIMINATIVE CLASSIFIER FOR PROCESSING A QUERY

(71) Applicant: AT&T Intellectual Property I, L.P., Atlanta, GA (US)

(72) Inventors: Ilija Zeljkovic, Scotch Plains, NJ (US); Srinivas Bangalore, Morristown, NJ (US); Patrick Haffner, Atlantic Highlands, NJ (US); Jay Wilpon, Warren, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/268,906

(22) Filed: Sep. 19, 2016

(65) Prior Publication Data

US 2017/0004216 A1   Jan. 5, 2017

Related U.S. Application Data

(63) Continuation of application No. 14/450,924, filed on Aug. 4, 2014, now Pat. No. 9,449,100, which is a continuation of application No. 12/347,513, filed on Dec. 31, 2008, now Pat. No. 8,799,279.

(51) Int. Cl.
| | |
|---|---|
| *G06F 7/00* | (2006.01) |
| *G06F 17/30* | (2006.01) |
| *G06N 99/00* | (2010.01) |

(52) U.S. Cl.
CPC .. *G06F 17/30867* (2013.01); *G06F 17/30011* (2013.01); *G06F 17/3071* (2013.01); *G06F 17/30648* (2013.01); *G06F 17/30864* (2013.01); *G06N 99/005* (2013.01)

(58) Field of Classification Search
CPC .................. G06N 99/005; G06F 17/30864
See application file for complete search history.

(56) References Cited

U.S. PATENT DOCUMENTS

| | | | |
|---|---|---|---|
| 5,864,846 A | 1/1999 | Voorhees et al. | |
| 6,192,360 B1 | 2/2001 | Dumais et al. | |
| 7,260,568 B2 | 8/2007 | Zhang et al. | |
| 7,356,187 B2 | 4/2008 | Shanahan et al. | |
| 7,636,715 B2 | 12/2009 | Kalleh | |
| 7,693,865 B2 | 4/2010 | Lu et al. | |
| 7,761,391 B2 | 7/2010 | Schmidtler et al. | |
| 7,769,751 B1 | 8/2010 | Wu et al. | |
| 2005/0080782 A1 | 4/2005 | Ratnaparkhi et al. | |
| 2006/0122978 A1 | 6/2006 | Brill et al. | |
| 2006/0224579 A1 | 10/2006 | Zheng | |
| 2006/0287980 A1 | 12/2006 | Liu et al. | |
| 2007/0106659 A1 | 5/2007 | Lu et al. | |
| 2007/0112764 A1 | 5/2007 | Yih et al. | |
| 2007/0185858 A1 | 8/2007 | Lu et al. | |
| 2008/0162302 A1 | 7/2008 | Sundaresan et al. | |

(Continued)

*Primary Examiner* — Jeffrey A Burke

(57) ABSTRACT

A method and apparatus for using a classifier for processing a query are disclosed. For example, the method receives a query from a user, and processes the query to locate one or more documents in accordance with a search engine having a discriminative classifier, wherein the discriminative classifier is trained with a plurality of artificial query examples. The method then presents a result of the processing to the user.

18 Claims, 3 Drawing Sheets

(56) References Cited

U.S. PATENT DOCUMENTS

| | | |
|---|---|---|
| 2008/0172357 A1 | 7/2008 | Rechis et al. |
| 2009/0099988 A1 | 4/2009 | Stokes et al. |
| 2009/0187515 A1 | 7/2009 | Andrew et al. |
| 2009/0259622 A1 | 10/2009 | Kolz et al. |
| 2009/0327260 A1 | 12/2009 | Li et al. |

METHOD AND APPARATUS FOR USING A DISCRIMINATIVE CLASSIFIER FOR PROCESSING A QUERY

This application is a continuation of U.S. patent application Ser. No. 14/450,924, filed Aug. 4, 2014, now U.S. Pat. No. 9,449,100, which is a continuation of U.S. patent application Ser. No. 12/347,513, filed Dec. 31, 2008, now U.S. Pat. No. 8,799,279, all of which are herein incorporated by reference in their entirety.

The present invention relates generally to query processing, and in particular, to a method and apparatus for using a discriminative classifier for processing a query.

BACKGROUND OF THE INVENTION

As the Internet has grown, search engines are relied upon for locating relevant information from various repositories located on the World Wide Web (WWW). For example, an Internet user may perform a search by entering a word, a phrase, or a set of keywords into a Web browser software, or a thin client toolbar running on the user's computer. The search engine has a query processor that finds matching information resources, e.g. web pages, images, documents, videos, and so on. The search engine may then provide one or more matching responses to the user. Search engines have also become prevalent in Intranets, i.e., private enterprise networks, where keywords are used by such search engines to locate documents and files.

The most common algorithms in search engines are based on inverted index search techniques. Inverted index search techniques are fast and can handle a large number of documents.

However, these techniques lack optimal (well-defined) criteria. For example, the search may be for a query with a limited domain. For example, the query may be for a specific type of restaurant in a specific city. When using an inverted index search technique, determining the importance of index terms used for ranking as compared to the importance of the geographical context is difficult. The index terms may have different significance in a local context as compared to a global context.

SUMMARY OF THE INVENTION

In one embodiment, the present invention provides a method and apparatus for using a classifier for processing a query. For example, the method receives a query from a user, and processes the query to locate one or more documents in accordance with a search engine having a discriminative classifier, wherein the discriminative classifier is trained with a plurality of artificial query examples. The method then presents a result of the processing to the user.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
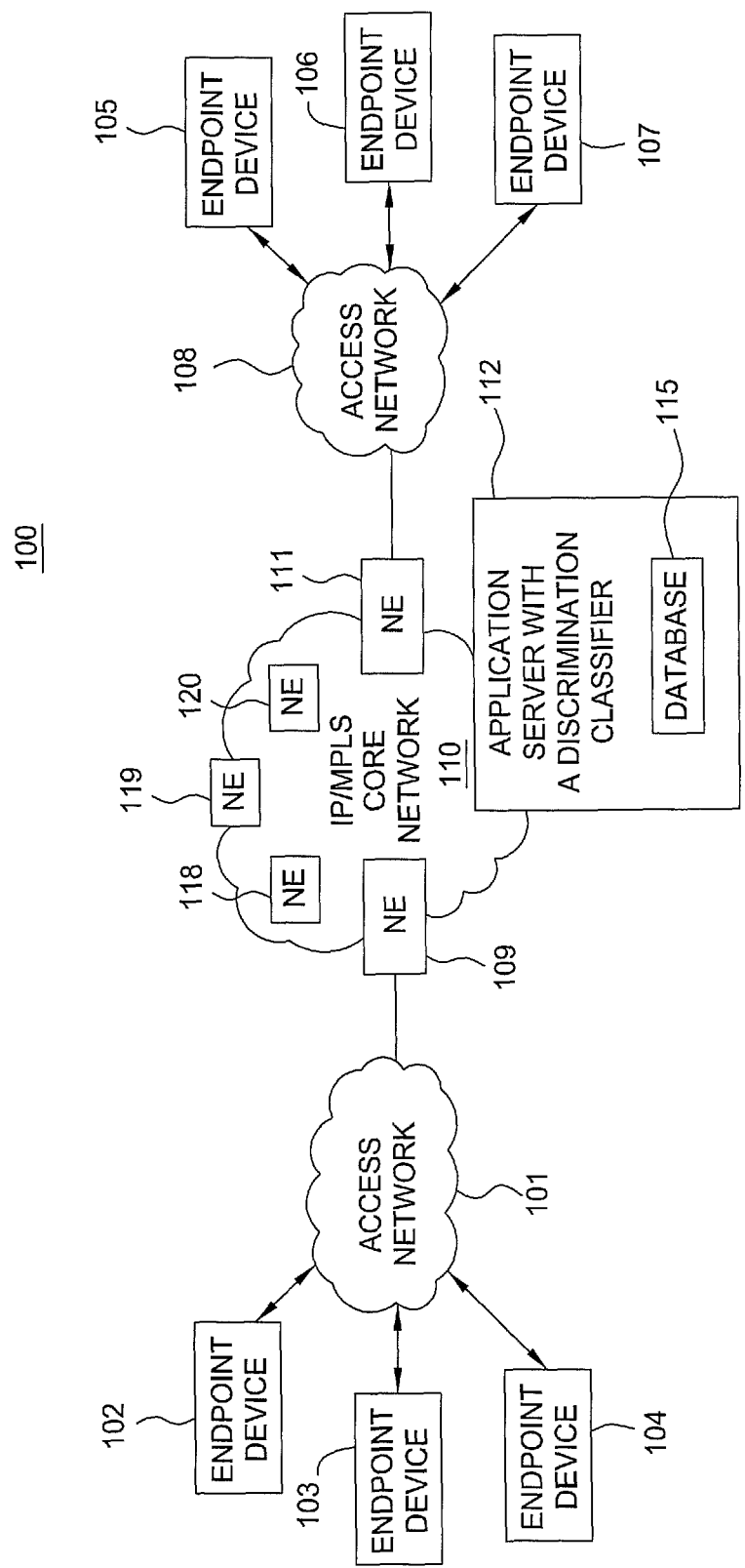
FIG. 1 illustrates an exemplary network where a discriminative classifier is deployed in a network for processing a query.

The present invention broadly discloses a method and apparatus for providing a local classifier for a network. For example, the local classifier may be provided in a search engine for a network. When the search engine receives a query, the search engine may then perform searches using the local classifier. In order to better describe the present invention, the following networking concepts and terminologies will first be provided:

Information retrieval (IR);
An n-gram;
Support Vector Machine (SVM) classifier.
Logistic regression classifier.

Information retrieval (IR) is the field of searching for information in documents, searching for documents themselves, searching for metadata which describe documents, or searching within databases, whether relational stand-alone databases or hypertextually-networked databases such as the World Wide Web.

An n-gram refers to a sub-sequence of n items from a given sequence. For example, if the sequence is a sequence of words and n is equal to two, the n-gram refers to a sub-sequence of 2 words from the given sequence. For example, if the sequence of words is "The temperature is rising rapidly" and n is equal to two, the sub-sequences are "The temperature", "temperature is", "is rising", and "rising rapidly."

Support Vector Machine (SVM) classifier refers to a discriminative classifier that maximizes separation between two classes using positive and negative training examples. SVM puts discriminative weights on search terms for each class, instead of putting Term Frequency-Inverse Document Frequency (TF-IDF) weights used by traditional search methods. For example, the positive training examples may provide similar weights to those of TF-IDF while the negative training examples may add discriminant negative weights that maximize the separations between classes.

Logistic regression (also known as Maximum Entropy classifier) is a model used for prediction of the probability of occurrence of an event by fitting data to a logistic curve, which transforms a continuous score into a probability ranging from 0 to 1. An example is classified as positive if its logistic score is close to 1, and as negative if its score is close to 0. Like SVMs, logistic regression can be viewed as a discriminant classifier which maximizes separation between classes, with the same type of weights. The main differences are the training algorithms use to estimate the weights, and the criteria used to minimize the number of non-zero weights (known as regularization).

An information retrieval process begins when a user enters a query into a computer system that has a search engine, or into a computer that has access to a search engine on another device. Queries are formal statements of information needs issued to the search engine. The search engine receives the query and processes the query to locate the desired information. The search engine retrieves information that matches the query and presents it the user. In order to locate relevant information in response to a query, the search engine uses n-grams that appear in documents.

FIG. 1 illustrates an exemplary network where a discriminative classifier is deployed in a network for processing a query. The network 100 comprises a plurality of endpoint devices 102-104 configured for communication with the Internet Protocol over Multi-Protocol Labeled Switch (IP/MPLS) network 110 (e.g., an IP based core backbone network supported by a service provider). The endpoint devices 102-104 may communicate with the IP/MPLS core network 110 via an access network 101. Similarly, a plurality of endpoint devices 105-107 are configured for communication with the core packet network 110 via an access network 108.

The endpoint devices 102-107 may comprise customer endpoint devices such as telephones, cellular phones, personal computers, laptop computers, Personal Digital Assistants (PDAs), servers, routers, and the like. The access networks 101 and 108 serve as a means to establish a connection between the endpoint devices 102-107 and the Network Elements (NEs) 109 and 111. The access networks 101 and 108 may each comprise a Digital Subscriber Line (DSL) network, a broadband cable access network, a Local Area Network (LAN), a Wireless Access Network (WAN), a $3^{rd}$ party network, and the like.

Some NEs (e.g., NEs 109 and 111) reside at the edge of the IP/MPLS core infrastructure and interface with customer endpoints over various types of access networks. An NE that resides at the edge of a core infrastructure is typically implemented as an edge router, a media gateway, a border element, a firewall, a switch, and the like. An NE may also reside within the IP network (e.g., NEs 118-120) and may be used as a mail server, a router, or like device. The IP/MPLS core network 110 comprises an application server 112 that contains a database 115, Border Elements (BEs) 109 and 111, and routers 118-120. The application server 112 may comprise any server or computer that is well known in the art, and the database 115 may be any type of electronic collection of data that is also well known in the art.

Those skilled in the art will realize that although only six endpoint devices, two access networks, five network elements and one application server are depicted in FIG. 1, the communication system 100 may be expanded by including any number of endpoint devices, access networks, network elements, $3^{rd}$ party networks, application servers, etc. without altering the scope of the present invention.

In one embodiment, the current method first presents the search problem in terms of a classification problem. For example, the method may build a profile, or set of features, for each document, or class, to be identified by a search engine. For example, if queries are being processed to search for a book in a library, each book may be profiled in terms of features like subject, author, title, etc.

The method then provides a scoring algorithm for the search engine, wherein the scoring algorithm is implemented as a discriminative classifier. For example, the method may provide a logistic regression classifier or an SVM classifier in the application server 112 that functions as a search engine to process queries.

The method then trains the discriminative classifier to distinguish a class relative to all other local classes. The classifier then creates separation margin between a class and all other classes. The training assigns an optimal weight to each of the features (which correspond to search terms) of each class (which corresponds to names or documents). That is, the distance between classes is maximized and the optimal weight is assigned to each term with the goal of uniquely identifying each document.

In one embodiment, the method constructs one or more examples for training from the names and documents available for each class. In one embodiment, the one or more examples for performing the training may be derived from logs of previous searches.

For the example above, if the author of a book has a unique name, and the author has published only one book, the discriminative classifier may assign more weight to the author's name as opposed to the subject or title. On the contrary, if the author has a popular name, e.g., Smith, the author's name may be assigned a small weight, e.g., close to zero. That is, less discriminative terms are given smaller weight.

In one example, the search engine may be used to process queries to locate a company in a local phone directory. A profile may then be built for each entry in the directory such that queries can be processed. For example, a profile for a dentist treating children may be built. Users may issue queries using a variety of terms e.g., "dental office", "dentist", "children's dentist", "children's health", etc. A discriminative classifier may assign more weight to "children's dentist" as opposed to simply the term "dentist." Furthermore, the discriminative classifier may include assigning a negative weight to the term "doctor" as the term may not be specific enough.

In one example, a discriminative classifier may be used by a search engine to process a query for XYZ Corporation. That is, the query may include the strings "XYZ" and "Corporation." "Corporation" is a string that is less discriminative as compared to that of "XYZ." Hence, the discriminative classifier may assign more weight to the string "XYZ" as compared to that of the string "Corporation." Consequently, the documents that have "XYZ" in their name should appear prior to documents that have "Corporation" in their name.

In one embodiment, the current method provides a discriminative classifier for a search engine that may process speech based queries. For example, the outputs from a speech recognition device and/or weights associated with words may be used as meta information. The query received via a voice input may include words that have no useful purpose, e.g., "umm", "ah", "eeh", "wait", etc. Speakers may utter sounds freely to a human listener and the listener would normally disregard the utterances that have no useful purpose. On the contrary, the voice recognition device may pick up every utterance and include the words in an n-gram regardless of usefulness. The training of the discriminative classifier (based on profiles built for each document) separates the classes.

The method then receives one or more queries. For example, a search term is received by a search engine. The search engine then processes the one or more queries to locate the desired information and presents the result to the user.

In one embodiment, the processing of the query may be based on meta information, e.g., user profiles, past search results, popularity of a listing, etc. For example, a user may issue a query and the context of the query may be understood based on previous search results, user profile, etc. For example, if previous queries were related to a computer and the user enters the search term "Apple", search results for Apple computer may be presented as opposed to results related to fruits.

The method then receives feedback on presented results. For example, the user may click on a link indicating that the result is of interest to the user. In another example, the user may provide feedback via an indicator of a degree of satisfaction, e.g., yes or no, for the provided results.

The method may then use the feedback information to retrain the discriminative classifier. The retraining may update the weights assigned to search terms. In one embodiment, the method may also retrain the discriminative classifier based on updates of documents and profiles of documents.

For the example above, if the author who had published only one book previously publishes additional five books, the weight assigned to the author's name may then be reduced in favor or assigning more weight to either the titles of the books or subject matter of each book. That is, optimal weights are assigned to each of the search terms such that each of the six books from the same author may also be uniquely identified.

Figure 2:
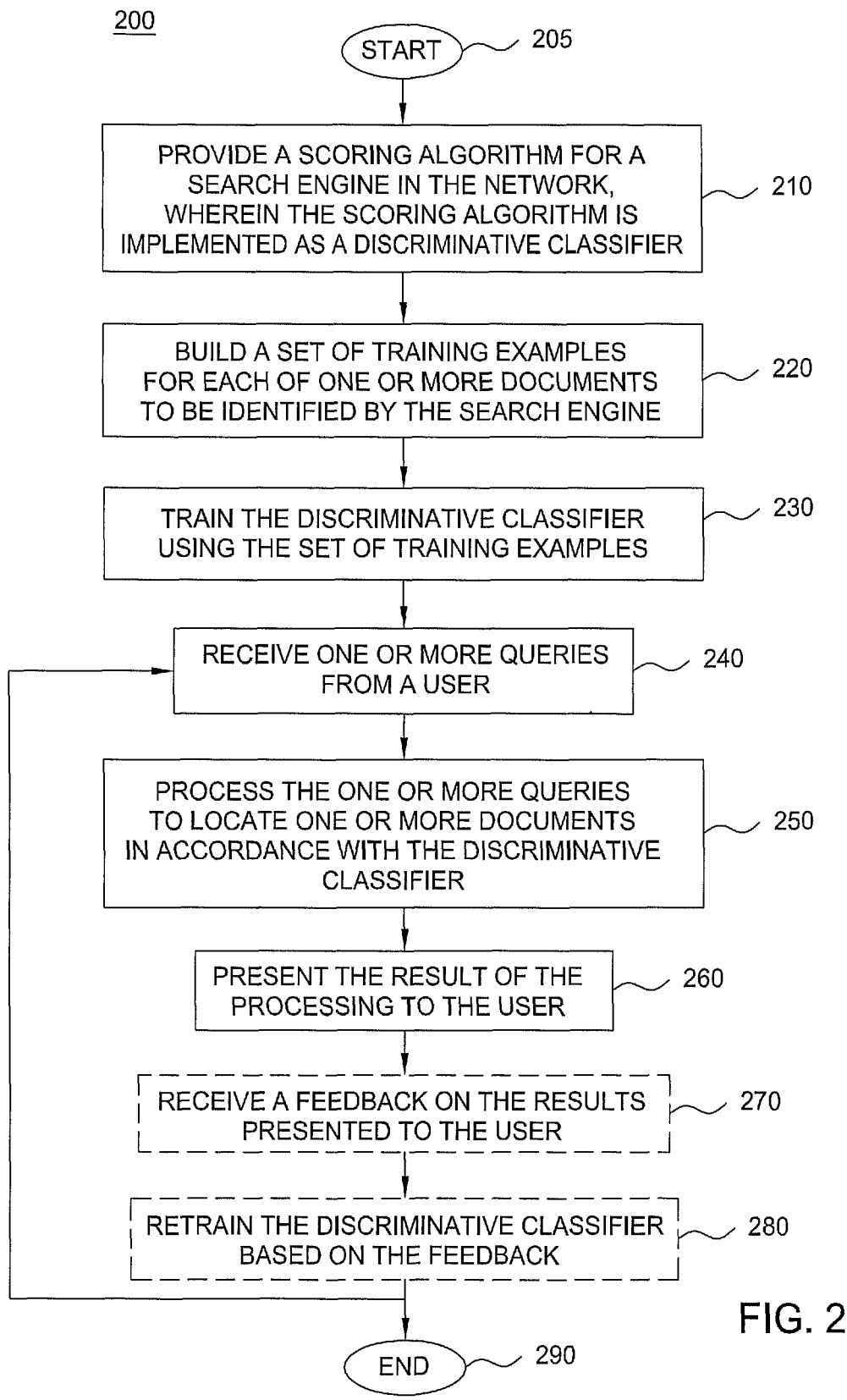
FIG. 2 illustrates a flowchart for using a discriminative classifier for processing a query.

FIG. 2 illustrates a flowchart of a method 200 for using a discriminative classifier for processing a query. For example, one or more steps of method 200 can be implemented by application server 112. Method 200 starts in step 205 and proceeds to step 210.

In step 210, method 200 provides a scoring algorithm for a search engine in the network, wherein the scoring algorithm is a discriminative classifier. For example, the method may provide a logistic regression classifier or an SVM classifier.

In step 220, method 200 builds a set of training examples for each of one or more documents to be identified by the search engine. For example, if queries are being processed to search for a book in a library, the method may build a profile for each book in terms of its subject, author, title, etc.

More specifically, training a classifier requires training data. In one embodiment of the present invention, the training data comprises artificial query examples. In other words, there is no need to collect and manually label user data. Instead, the present invention creates the query examples artificially (simulated examples), thereby providing discriminant learning that optimizes searches in a way that approximates user choices.

For example, for each document, the method may generate a plurality of artificial examples that comprises typical examples of queries (broadly referred to as positive examples) and counter-examples of queries (broadly referred to as negative examples). Assume for an algorithm that, for each document D* produces a list of example queries Q*:

D1→(Q1,Q2)
D2→(Q2,Q3)

Suppose one wishes to build a classifier that provides an answer if a query should return document D1 or not, then:
positive examples include Q1 and Q2
negative examples include Q3.

More specifically, using a listing B1 (broadly a document), where B1=[Westfield Gourmet Pizza, 123 Westfield Ave., Westfield, N.J.]. For B1, the following queries are artificially created: 1. Westfield, 2. Gourmet, 3. Pizza, 4. Westfield Gourmet, 5. Gourmet Pizza, and 6. Westfield Gourmet Pizza. Then, in one embodiment, each query is repeated with the street name appended (e.g., appending the street name "Westfield Ave." to the Query 6 above will produce "Westfield Gourmet Pizza, Westfield Ave."), and so on. Furthermore, queries with street name is further appended with town name (e.g., appending the town name "Westfield" to the Query 6 above will produce "Westfield Gourmet Pizza, Westfield Ave., Westfield"), and so on. It should be noted that the above six (6) illustrative examples are considered to be positive examples.

However, the present invention also automatically creates artificial negative examples for each listing or document. In one embodiment, all (or a subset of) other artificial positive examples for all other listings or documents will be considered to be negative examples. However, if a negative example is identical to a current positive example, then the negative example will be considered to be a positive example. For example, if there is another listing comprising "ABC pizza" having the artificial queries of "ABC pizza" and "pizza", then "ABC pizza" is a negative example, whereas "pizza" is still a positive example. Furthermore, during the training process, if a particular query can be generated from more than one listing or document, it is treated as a multi-label query which can be matched to any of these listings, and can be contrasted to all remaining listings.

In step 230, method 200 trains the discriminative classifier using the set of artificial query examples. The training enables the discriminative classifier to distinguish a class or a group of similar classes relative to all other classes. For example, the method performs the training to assign an optimal weight to each of one or more search terms associated with each document such that the search engine is able to uniquely identify each document.

In step 240, method 200 receives one or more queries from a user. For example, a user may provide one or more search or query terms to a search engine.

In step 250, method 200 processes the one or more queries to locate one or more documents in accordance with the discriminative classifier. For example, the method locates the desired information using the discriminative classifier to uniquely identify documents that best match the search terms. The classifier attributes a search score to each document. The documents are then sorted in decreasing order of this score. The top N documents in this sorted list may be considered as a match, or all the documents whose score is above a given threshold may be considered as a match.

In step 260, method 200 presents the result of the processing to the user. For example, the method presents one or more documents that match the one or more search or query terms.

In optional step 270, method 200 receives a feedback on the results presented to the user. For example, the method may receive a feedback from the user in a form of a response (e.g., yes or no) to a question such as "is the search result what you are looking for?".

In optional step 280, method 200 retrains the discriminative classifier based on the feedback. For example, the method may retrain the discriminative classifier such that responses for future queries may be improved. The method then proceeds to step 290 to end processing the current query, or return to step 240 to continue receiving more queries.

Those skilled in the art would realize that two or more steps of method 200 may occur in parallel. As such, the order of the steps in FIG. 2 is not intended to limit the scope of the invention to a specific implementation. For example, the method may first build the profile for each document (as described in step 220) prior to providing the discriminative classifier (as described in step 210). Alternatively, building the profile for each document and providing the discriminative classifier may occur concurrently.

It should be noted that although not specifically specified, one or more steps of method 200 may include a storing, displaying and/or outputting step as required for a particular application. In other words, any data, records, fields, and/or intermediate results discussed in the method 200 can be stored, displayed and/or outputted to another device as required for a particular application. Furthermore, steps or blocks in FIG. 2 that recite a determining operation, or involve a decision, do not necessarily require that both branches of the determining operation be practiced. In other words, one of the branches of the determining operation can be deemed as an optional step.

Figure 3:
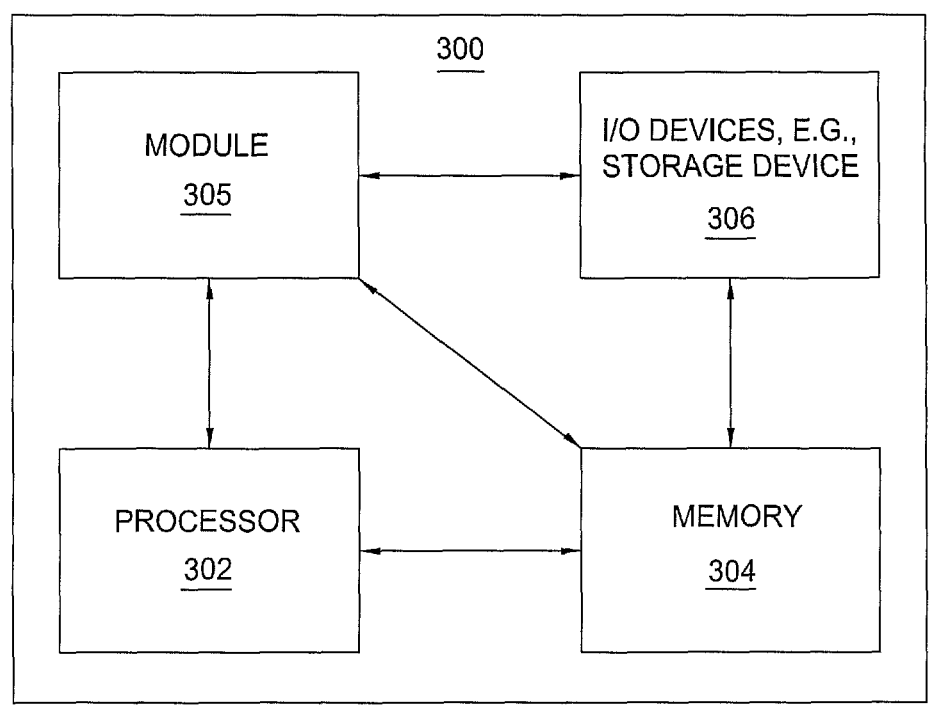
FIG. 3 illustrates a high level block diagram of a general purpose computer suitable for use in performing the functions described herein.

FIG. 3 depicts a high level block diagram of a general purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for providing a local classifier for a network, and various input/output devices 306 (e.g., network interface cards, such as 10, 100, or Gigabit Ethernet NIC cards, Fibre Channel Host Bus Adapters, Infiniband adapters, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, or entirely in hardware, e.g., using application specific integrated circuits (ASIC), a general purpose computer or any other hardware equivalents. In one embodiment, the present module or process 305 for providing a local classifier for a network can be loaded into memory 304 and executed by processor 302 to implement the functions as discussed above. As such, the present method 305 for providing a local classifier for a network (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a query, the method comprising:
   receiving, by a processor, the query from a user;
   processing, by the processor, the query to locate a plurality of document in accordance with a search engine having a discriminative classifier, wherein the discriminative classifier is trained with a plurality of artificial multi-label query examples, wherein the artificial multi-label query examples comprise simulated queries automatically generated from terms in the plurality of documents, wherein each of the artificial multi-label query examples further comprises a name and metadata information associated with the name, wherein one of the simulated queries comprises a plurality of the terms selected from the plurality of documents;
   retraining, by the processor, the discriminative classifier based on an update to at least one the plurality of documents and based on an example derived from a log of previous searches; and
   presenting, by the processor, a result of the processing to the user.

2. The method of claim 1, further comprising:
   receiving a feedback on the result presented to the user; and
   retraining the discriminative classifier based on the feedback.

3. The method of claim 1, wherein the discriminative classifier comprises a support vector machine classifier.

4. The method of claim 1, wherein the discriminative classifier further trained based on the plurality of document within a class.

5. The method of claim 1, wherein the query is a speech based query.

6. The method of claim 1, wherein the meta information comprises a user profile.

7. A tangible computer-readable medium storing medium instructions which, executed by a processor, cause the processor to perform operations for processing query, the operations comprising:
   receiving the query from a user;
   processing the query to locate a plurality of documents in accordance with a search engine having a discriminative classifier, wherein the discriminative classifier is trained with a plurality of artificial multi-label query examples, wherein the artificial multi-label query examples comprise simulated queries automatically generated from terms in the plurality of documents, wherein each of the artificial multi-label query examples further comprises a name and metadata information associated with the name, wherein one of the simulated queries comprises a plurality of the terms selected from the plurality of documents;
   retraining, the discriminative classifier based on an update to at least one the plurality of documents and based on an example derived from a log of previous searches; and
   presenting a result of the processing to the user.

8. The tangible computer-readable medium of claim 7, the operations further comprising:
   receiving a feedback on the result presented to the user; and
   retraining the discriminative classifier based on the feedback.

9. The tangible computer-readable medium of claim 7, wherein the discriminative classifier comprises a support vector machine classifier.

10. The tangible compute readable medium of claim 7, wherein the discriminative classifier is further trained based on an example constructed from the plurality of documents being within a class.

11. The tangible computer-readable medium of claim 7, wherein the query is a speech based query.

12. The tangible computer-readable medium of claim 7, wherein the meta information comprises a user profile.

13. An apparatus for processing a query, the apparatus comprising:
   a processor; and
   a computer-readable medium storing instructions which, when executed by the processor, cause the processor to perform operations, the operations comprising:
      receiving the query from a user;
      processing the query to locate a plurality of documents in accordance with a search engine having a discriminative classifier, wherein the discriminative classifier is trained with a plurality of artificial multi-label query examples, wherein the artificial multi-label query examples comprise simulated queries automatically generated from terms in the plurality of documents, wherein each of the artificial multi-label query examples further comprises a name and metadata information associated with the name, wherein one of the simulated queries comprises a plurality of the terms selected from the plurality of documents;

retraining the discriminative classifier based on an update to at least one the plurality of documents and based on an example, derived from a log of previous searches; and presenting a result of the processing to the user.

14. The apparatus of claim 13, wherein the operations further comprise:

receiving a feedback on the result presented to the user; and retraining the discriminative classifier based on the feedback.

15. The apparatus of claim 13, wherein the discriminative classifier comprises a support vector machine classifier.

16. The apparatus of claim 13, wherein the discriminative classifier is further trained based on an example constructed from the plurality of documents being within a class.

17. The apparatus of claim 13, wherein the query is a speech based query.

18. The apparatus of claim 13, wherein the meta information comprises a user profile.

* * * * *